United States Patent
Butler et al.

(10) Patent No.: US 8,500,891 B2
(45) Date of Patent: Aug. 6, 2013

(54) WASTE HEAT RECOVERY FROM A CARBON CAPTURE PROCESS

(75) Inventors: John Oliver Butler, Tucker, GA (US); Rasesh R. Kotdawala, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 488 days.

(21) Appl. No.: 12/775,541

(22) Filed: May 7, 2010

(65) Prior Publication Data

US 2010/0282082 A1    Nov. 11, 2010

Related U.S. Application Data

(60) Provisional application No. 61/176,733, filed on May 8, 2009.

(51) Int. Cl.
*B01D 53/14* (2006.01)

(52) U.S. Cl.
USPC ............... 96/234; 96/355; 95/236; 110/342; 110/345; 110/347; 34/72

(58) Field of Classification Search
None
See application file for complete search history.

(56) References Cited

U.S. PATENT DOCUMENTS

| | | | |
|---|---|---|---|
| 4,230,469 | A | 10/1980 | Grimm et al. |
| 4,411,204 | A | 10/1983 | Hamilton |
| 6,521,026 | B1 | 2/2003 | Goto |
| 7,056,482 | B2 | 6/2006 | Hakka et al. |
| 7,083,658 | B2 | 8/2006 | Andrus, Jr. et al. |
| 7,261,046 | B1 | 8/2007 | Rettig et al. |
| 2009/0151566 | A1 | 6/2009 | Handagama et al. |
| 2009/0211500 | A1 | 8/2009 | Andrus, Jr. et al. |

FOREIGN PATENT DOCUMENTS

| | | |
|---|---|---|
| WO | WO 01/36873 | 5/2001 |
| WO | WO 2004/080573 | 9/2004 |
| WO | WO 2007/073201 | 6/2007 |
| WO | WO 2008/099291 | 8/2008 |
| WO | WO 2008/143966 | 11/2008 |

OTHER PUBLICATIONS

PCT International Search Report and the Written Opinion of the International Searching Authority dated Sep. 24, 2010—(PCT/US2010/034016).

*Primary Examiner* — Duane Smith
*Assistant Examiner* — Pankti Patel
(74) *Attorney, Agent, or Firm* — Robert D. Crawford

(57) ABSTRACT

A system and process for capturing $CO_2$ 100 is disclosed. The process 100 includes reusing heat from a $CO_2$ compression process 120 by providing the heat to a fuel treatment process 130. The heat may used to dry a fossil fuel to improve the efficiency of the fossil fuel combustion.

12 Claims, 3 Drawing Sheets

WASTE HEAT RECOVERY FROM A CARBON CAPTURE PROCESS

BACKGROUND

The application generally relates to heat recovery. The application relates more specifically to a system and method and for recovering waste heat from a carbon dioxide capture process, and using the waste heat to dry a fossil fuel.

Carbon dioxide ($CO_2$) gas is released into the atmosphere from various industrial facilities such as fossil fuel power stations and refuse incinerating plants. Although substantial reductions in emissions of $CO_2$ could be achieved by increase in efficiency of energy conversion and utilization, such reductions may not be sufficient to achieve atmospheric $CO_2$ stabilization. Therefore, efforts have been directed towards the capture and sequestration of the $CO_2$ emitted by fossil fuel power stations.

One type of fossil fuel power station uses pulverized coal as a combustion source. The pulverized coal may have moisture contents varying from about 3% to about 50% by weight. In some instances, the pulverized coal may need drying before being efficiently combusted to produce heat. In these instances, the pulverized coal may be dried by using plant steam, furnace flue gases, or regenerative air heaters. Often, bituminous or sub-bituminous coals are dried in the pulverizers that reduce the particle size of the coal by the same air that is used to combust the pulverized coal. For example, flue gas may be flowed through a tubular or regenerative air heater to heat the primary air. For lower rank, higher moisture coals, the furnace flue gas may also be mixed with ambient air and supplied to a coal-drying unit. In the case of using steam heat in the coal-drying unit, steam supplies heat to a fluidized bed and acts as a fluidizing medium and drying medium. Another type of fossil fuel used by power stations is lignite, which is high in moisture content and often requires drying before combustion.

Various systems and methods have been developed to capture and reuse $CO_2$ gas. For example, an ammonia based process has been developed that treats cooled flue gas with aqueous ammonia, which reacts with the $CO_2$ in the flue gas to form ammonia carbonate or bicarbonate. The temperature of the material binding the captured $CO_2$ can be increased to reverse the capture reaction to release the $CO_2$ under pressure. In another example, various amine processes have been developed that treat flue gas with an aqueous amine solution in an absorption/stripping type of regenerative process to absorb the $CO_2$ for later desorption and capture.

In these exemplary $CO_2$ capture methods, and in other similar methods, the captured $CO_2$ is compressed after regeneration for transportation and storage. The regeneration and compression of the $CO_2$ results in a significant amount of waste heat.

What is needed is a system and method for recovering waste heat generated during a $CO_2$ capture process, and in particular, a system and method for improving overall plant efficiency by recovering waste heat for other plant or facility operations such as coal drying.

Intended advantages of the disclosed systems and methods satisfy one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY

According to aspects illustrated herein, there is provided a method for recovering heat. The method includes separating an amount of $CO_2$ from a gas stream by a capture process, providing the separated $CO_2$ to a compression process, capturing heat released during the compression process, and providing the heat released during the compression process to a fuel treatment process.

According to other aspects illustrated herein, there is provided a system for recovering heat including a capture system for separating $CO_2$ from a gas stream and a compression system for compressing $CO_2$ separated from the gas stream, and a fuel treatment system. The compression system includes at least one heated air stream heated by the compression system. The fuel treatment system receives the at least one heated air stream.

According to other aspects illustrated herein, there is provided a $CO_2$ capture system including a combustion system for generating a flue gas steam including $CO_2$, a capture system for separating an amount of $CO_2$ from the flue gas stream, a compression system for compressing $CO_2$ separated from the flue gas stream, and a fuel treatment system. The compression system includes heated air stream heated by the compression system. The fuel treatment system receives the heated air stream.

The above described and other features are exemplified by the following figures and detailed description.

DETAILED DESCRIPTION OF THE EXEMPLARY EMBODIMENTS

Figure 1:
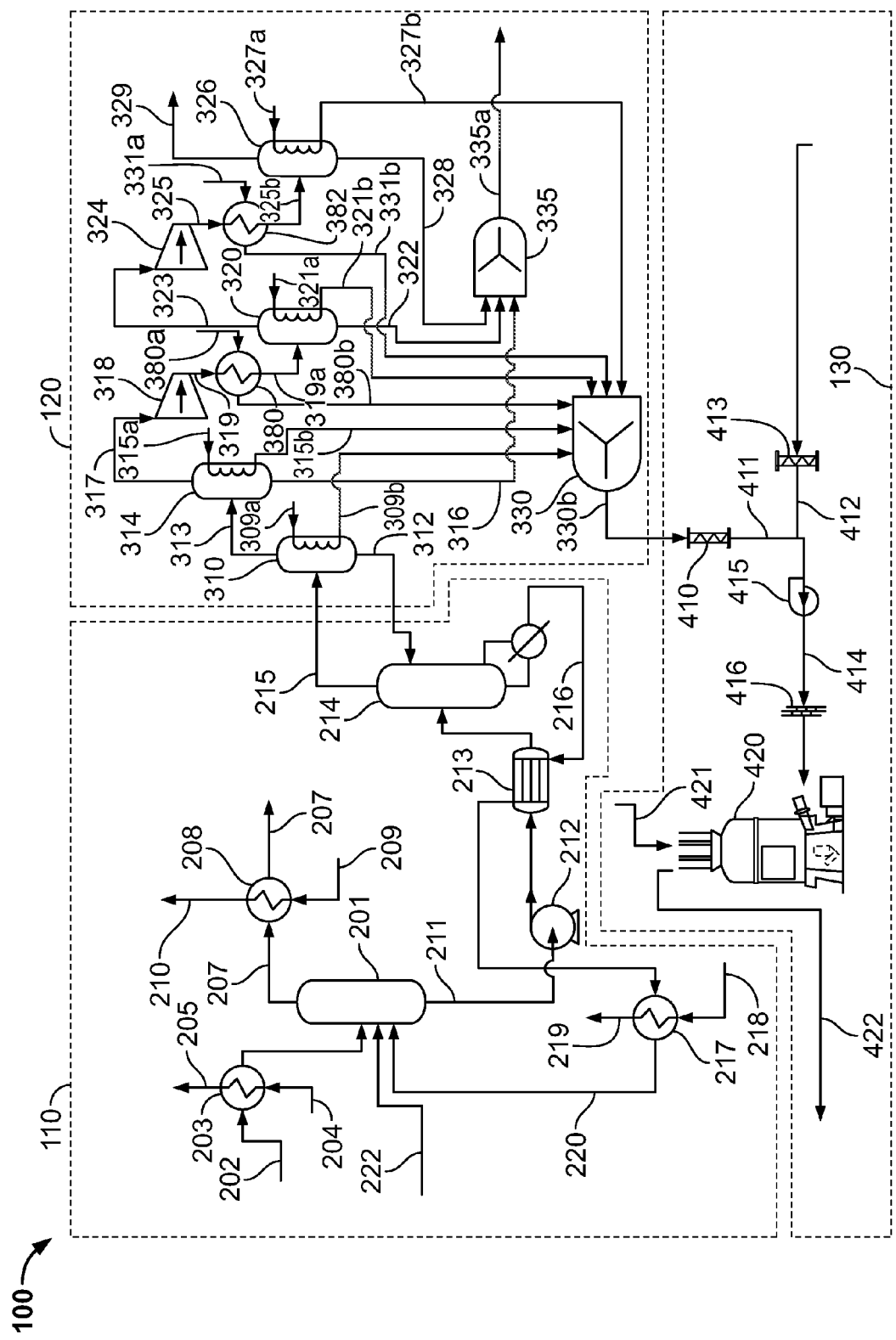
FIG. 1 is a schematic diagram of an embodiment of a process to recover waste heat from a $CO_2$ capture process according to a first embodiment of the invention.

FIG. 1 is a process flow diagram for one exemplary embodiment of a $CO_2$ capture process 100, hereinafter referred to as the "process 100", according to the invention. Referring to FIG. 1, the process 100 includes a $CO_2$ capture or removal process 110, a $CO_2$ compression process 120, and a waste heat reuse process 130. In this exemplary embodiment, the $CO_2$ removal process 110 is an amine-based process. In another embodiment, the $CO_2$ removal process 110 may be an ammonia based process or other process for removing an acid gas contaminant from a gas stream. The gas stream may be a flue gas stream from a fossil fuel combustion process.

The $CO_2$ removal process 110 includes a $CO_2$ absorption unit 201, hereinafter referred to as "absorption unit 201," configured to contact the gas stream to be purified and one or more wash liquids. In one embodiment, the gas stream is a flue gas stream including $CO_2$. In one embodiment, the was liquid may be a water/amine wash liquid. In another embodiment, the wash liquid may include an amine compound. In one embodiment, the gas stream is a flue gas stream containing $CO_2$ and the wash liquid is a water/amine wash liquid. A flue gas stream from which $CO_2$ is to be removed is fed to the absorption unit 201 via a flue gas line 202. The flue gas stream is cooled by a heat exchanger 203. The heat exchanger 202 is provided with a cooling fluid from a cooling fluid feel line 204. The cooling fluid removes heat from the flue gas stream and is discharged from the heat exchanger via cooling fluid discharge line 205.

In the absorption unit 201, flue gas is contacted with wash liquid. During this contact, $CO_2$ from the flue gas is absorbed in the wash liquid. In one embodiment, the flue gas is contacted with the wash liquid by bubbling flue gas through wash liquid or by spraying wash liquid into the flue gas. The wash liquid is fed to the absorption unit 201 via a wash liquid feed line 220. Additional make up wash liquid may be fed to the absorption unit 201 via make up line 222. Flue gas depleted of $CO_2$ leaves the absorption unit 201 via a discharge line 207. The flue gas may be further cooled by a heat exchanger 208 and/or may be polished by direct contact with water in a water wash unit (not shown). The heat exchanger 208 is provided with a cooling fluid via line 209. The cooling fluid is discharged from the heat exchanger via discharge line 210.

The wash liquid containing absorbed $CO_2$ and contaminants leaves the absorption unit 201 via a discharge line 211. The wash liquid is pumped by pump 212 through a heat exchanger 213 to a stripper 214 where $CO_2$ is separated from the wash water. The gaseous $CO_2$ leaves the stripper 214 via line 215. The regenerated wash liquid, depleted of absorbed $CO_2$, is discharged from the stripper 214 through discharge line 216 and passed through heat exchanger 213, where the regenerated wash liquid removes heat from the wash liquid containing absorbed $CO_2$. The regenerated wash liquid is then cooled by heat exchanger 217. The heat exchanger 217 is supplied with a cooling fluid from feed line 218. The cooling fluid is discharged from the heat exchanger through discharge line 219. The cooled regenerated wash liquid is then returned to the absorber 201 via feed line 220 to complete the absorption cycle.

The gaseous $CO_2$ leaving the $CO_2$ removal process 110 via line 215 is provided to the $CO_2$ compression process 120. The $CO_2$ is fed to a first flash unit 310 where the $CO_2$ is cooled. $CO_2$ is provided to the first flash unit 310 in a temperature range of about 90° C. to about 235° C. The first flash unit 310 may be a heat exchanger or act as a heat exchanger. A first air stream is provided to the first flash unit 310 via a first air line 309a. The $CO_2$ is cooled by transferring heat to the first air stream during a first flash process. In the first flash unit 310, moisture is removed from the $CO_2$ during the flash process. The moisture is returned via a first moisture discharge line 312 to stripper 214. In another embodiment, the moisture may be provided to other processes or systems with the $CO_2$ capture process 100, or to other facility operations. The term "moisture" is intended to include residual wash liquid, liquid water, water vapor, and a combination thereof, and to any contaminants and impurities in the water. $CO_2$ is discharged from the first flash unit 310 through a first $CO_2$ discharge line 313 and fed to a second flash unit 314. $CO_2$ is provided to the second flash unit 314 in a temperature range of about 90° C. to about 235° C. A first heated air stream is discharged from the first flash unit 310 via a first heated air line 309b and provided to a mixer 330. Additional flash units, as discussed below, may also be heat exchangers or act as a heat exchangers.

In the second flash unit 314, additional moisture is removed from the $CO_2$ during a second flash process. Moisture removed from the $CO_2$ is discharged from the second flash unit 314 through a second moisture discharge line 316 and is provided to a second mixer 335. A second air stream is provided to the second flash unit 314 via a second air line 315. Heat is transferred to the second air stream from the $CO_2$ during a second flash process in the second flash unit 314. A second heated air stream is discharged from the second flash unit 314 and provided to mixer 330 via a second heated air line 315b. $CO_2$ is discharged from the second flash unit 314 through a second $CO_2$ discharge line 317 and provided to a first compressor unit 318.

The first compressor unit 318 compresses the $CO_2$ to an increased pressure. The pressurized $CO_2$ is discharged through a first compressor discharge line 319 to a first heat exchanger 380. The first heat exchanger 380 is a first intercooler. A first intercooler air stream is provided to the first intercooler 380 via a first intercooler air line 380a. In the first intercooler 380, heat is transferred from the $CO_2$ to the first intercooler air stream. A first heated intercooler air stream is discharged from the first intercooler 380 via a first intercooler heated air line 380b and provided to mixer 330. $CO_2$ discharged from the first intercooler 380 is provided to a third flash unit 320 via a first intercooler discharge line 319a. $CO_2$ is provided to the third flash unit 320 in a temperature range of about 90° C. to about 235° C.

In the third flash unit 320, additional moisture is removed from the $CO_2$ and provided to the second mixer 335 via a third moisture discharge line 322. A third air stream is provided to the third flash unit 320 via a third air line 321a. In the third flash unit 320, heat is transferred from the $CO_2$ to the third air stream during a third flash process. A third heated air stream is discharged from the third flash unit 320 via a third heated air line 321b and provided to the mixer 330. $CO_2$ is discharged from the third flash unit 320 through a third $CO_2$ discharge line 323 and provided to a second compressor unit 324.

The second compressor unit 324 compresses the $CO_2$ to an increased pressure. The pressurized $CO_2$ is discharged through a second compressor discharge line 325 to a second heat exchanger 382. The second heat exchanger 382 is a second intercooler. A second intercooler air stream is provided to the second intercooler 382 via second intercooler air line 331a. In the second intercooler 382, heat is transferred from the $CO_2$ to the second intercooler air stream. A second heated intercooler air stream is discharged from the second intercooler 382 via a second intercooler heated air line 331b and provided to mixer 330. $CO_2$ discharged from the second intercooler 382 is provided to a fourth flash unit 326 via a second intercooler discharge line 325b. $CO_2$ is provided to the fourth flash unit 316 in a temperature range of about 90° C. to about 235° C.

In the fourth flash unit 326, additional moisture is removed from the $CO_2$ and provided to the second mixer 335 via a fourth moisture discharge line 328. A fourth air stream is provided to the fourth flash unit 326 via a fourth air line 327a. In the fourth flash unit 326, heat is transferred from the $CO_2$ to the fourth air stream during a fourth flash process. A fourth heated air stream is discharged from the fourth flash unit 326 via a fourth heated air line 327b and provided to the mixer 330. $CO_2$ is discharged from the fourth flash unit 326 through a fourth $CO_2$ discharge line 329 and is available for further processing.

As discussed above, heated air from the first, second, third and fourth flash units 310, 314, 320 and 326, and well as heated air from the first and second intercoolers 380, 382, is provided to the mixer 330 to form a reuse heated air line 330b via first, second, third and fourth heated air lines 309b, 315b, 321b and 327b, and first and second intercooler heated air lines 315b and 331b, respectively.

In another embodiment, one or more flash units and one or more intercoolers may be used to provide heated air to the mixer 330. In another embodiment, the heated air lines may be combined and/or excluded by one or more mixers and/or bypasses to form a reuse heated air line 330b. In one embodiment, the first, second, third and fourth air streams, as well as the first and second intercooler air streams, are initially from ambient temperature to about 65° C. In one embodiment, the flash and intercooler processes heat the air to a temperature of between about 65° C. to about 180° C.

In another embodiment, the heated air from air lines 315, 331 and 337 may be discharged from the $CO_2$ compression process 120 and/or provided to the mixer 330 in any combination. In yet another embodiment, fewer or more flash units 310, 314, 320, 326 and compressor units 318, 325 may be used depending upon the amount of compression obtained by each unit and the desired amount of pressurization.

As can be further seen in FIG. 1, heated air from the $CO_2$ compression process 120 is provided to the waste heat reuse process 130 form the mixer 330 via a reuse heated air line 330*b*. The waste heat reuse process 130 is a fuel treatment process. In this exemplary embodiment, the waste heat reuse process 130 is a coal pulverization process with drying. The heated air is provided to a damper 410, which may by-pass some of the heated air before discharging the heated air through a line 411. The heated air is combined with additional heated air from an additional heated air line 412. The additional heated air may be provided from at least one regenerative air heater (not shown) or other source typically found in a power plant. At least some of the additional heated air may be by-passed by a second damper 413.

The heated air and additional heated air are combined in a primary air line 414. The primary air line 414 is in fluid communication with an air flow device 415, which controls the volume and velocity of air in the primary air line 414. In one embodiment, the air flow device 415 may be a primary air (PA) fan. The flow rate of the heated air in the primary air line 414 is measured by a flow measurement device 416. In one embodiment, the flow measurement device may be pitot tubes.

The heated air is provided to a pulverizer 420, where the heated air contacts a fossil fuel provided to the pulverizer 420 though a feed line 421. The fossil fuel may be a coal fuel. In one embodiment, the coal fuel may be a high moisture coal, such as, but not limited to, bituminous and sub-bituminous coal.

In the pulverizer, the heated air removes moisture from and/or preheats the coal. The pulverized coal and heated air is discharged from the pulverizer through a pulverized fuel feed line 422. In such a manner, the heated air from the flash units 310, 314, 320 and 326 may be used to dry the coal. The pulverized coal and heated air is provided to a boiler (not shown) for combustion. In one embodiment, the coal and heated air is provided to the boiler at a temperature between about 50° C. and about 80° C. In another embodiment, one or more pulverizers 420 may be used to treat the coal.

Figure 2:
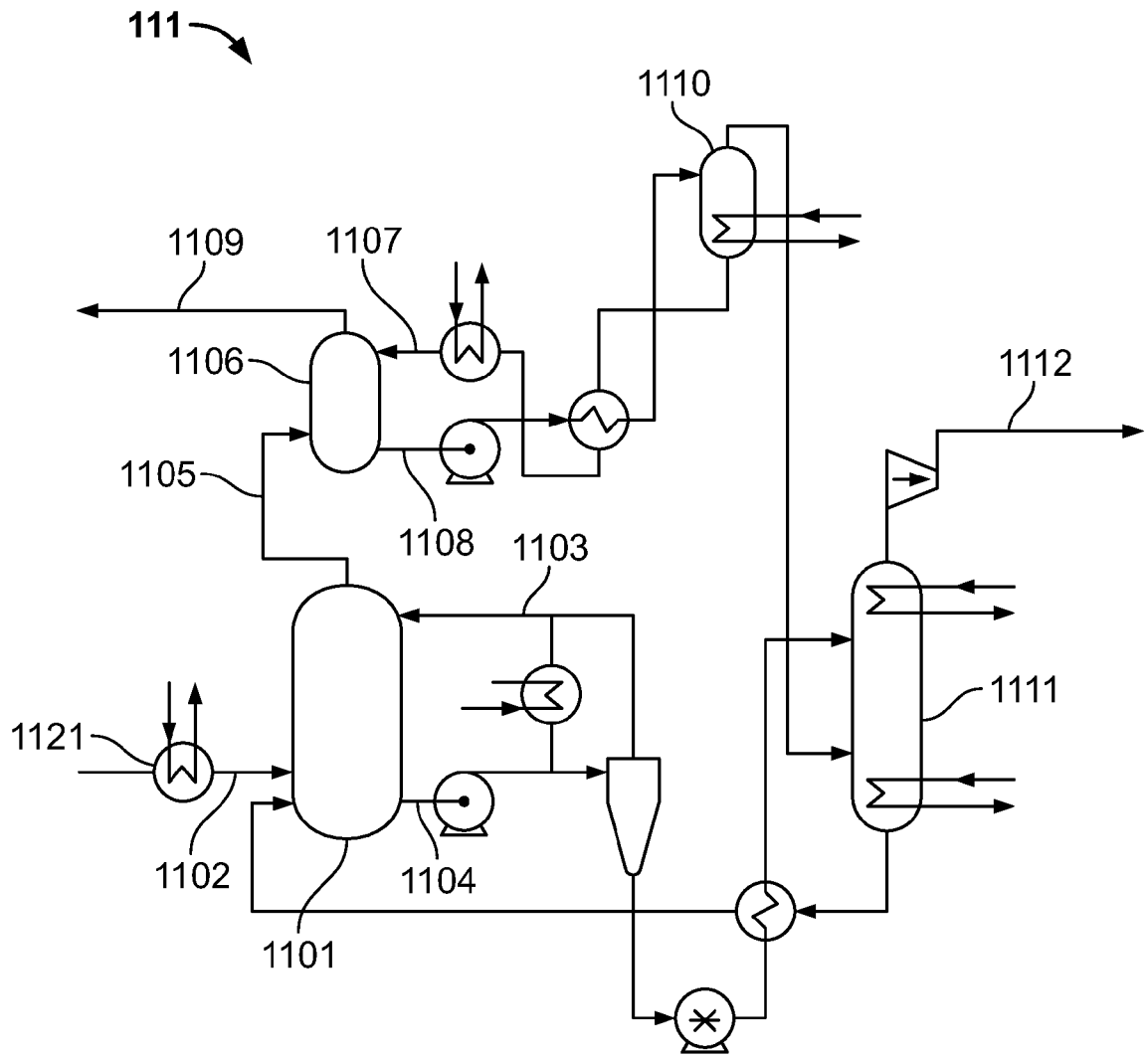
FIG. 2 is a schematic diagram of an exemplary $CO_2$ capture process.

In another embodiment of the invention, the $CO_2$ removal process 110 (FIG. 1) is an ammonia-based process 111 shown in FIG. 2. Referring to FIG. 2, the ammonia-based process 111 includes a $CO_2$ absorption unit 1101, hereinafter referred to as "absorption unit 1101," arranged to contact a gas stream to be purified and a wash liquid stream. The gas stream may be a flue gas stream. The wash liquid stream includes ammonia. The wash liquid stream removes contaminants including $CO_2$ from the flue gas.

The flue gas from which $CO_2$ is to be removed is fed to the $CO_2$ absorption unit 1101 via line 1102. The flue gas may be cooled by a first heat exchanger 1121 before entering the absorption unit 1101. In the $CO_2$ absorption unit 1101, the flue gas is contacted with the wash liquid. The flue gas may be contacted with the wash liquid by bubbling the flue gas through said wash liquid or by spraying the wash liquid into the flue gas. The wash liquid is fed to the $CO_2$ absorption unit via line 1103. In the absorption unit 1101, $CO_2$ from the flue gas is absorbed in the wash liquid by formation of carbonate or bicarbonate of ammonium either in dissolved or solid form. Used wash liquid containing absorbed $CO_2$ leaves the absorption unit 1101 via line 1104 and is brought to a stripping unit 1111 where $CO_2$ is separated from the wash liquid. The separated $CO_2$ leaves the stripping unit via line 1112, and is provided to the $CO_2$ compression process 120 (FIG. 1). Flue gas depleted of $CO_2$ leaves the absorption unit 1101 via line 1105.

The chilled ammonia process 111 further comprises a water wash unit 1106. The water wash unit 1106 is configured to contact the depleted flue gas depleted of $CO_2$ with a second wash water. The second wash water is fed to the water wash unit 1106 via line 1107. In the water wash unit 1106, contaminants (e.g. ammonia) remaining in the depleted flue gas are absorbed in the wash water. Wash water containing absorbed contaminants leaves the water wash unit via line 1108. Depleted flue gas cleansed of contaminants leaves the water wash unit 1106 via line 1109. The second wash water may be recycled via a regenerator unit 1110, where contaminants are separated from the second wash water. In yet other embodiments, other $CO_2$ capture processes may be used to provide $CO_2$ to the $CO_2$ compression process 120.

Figure 3:
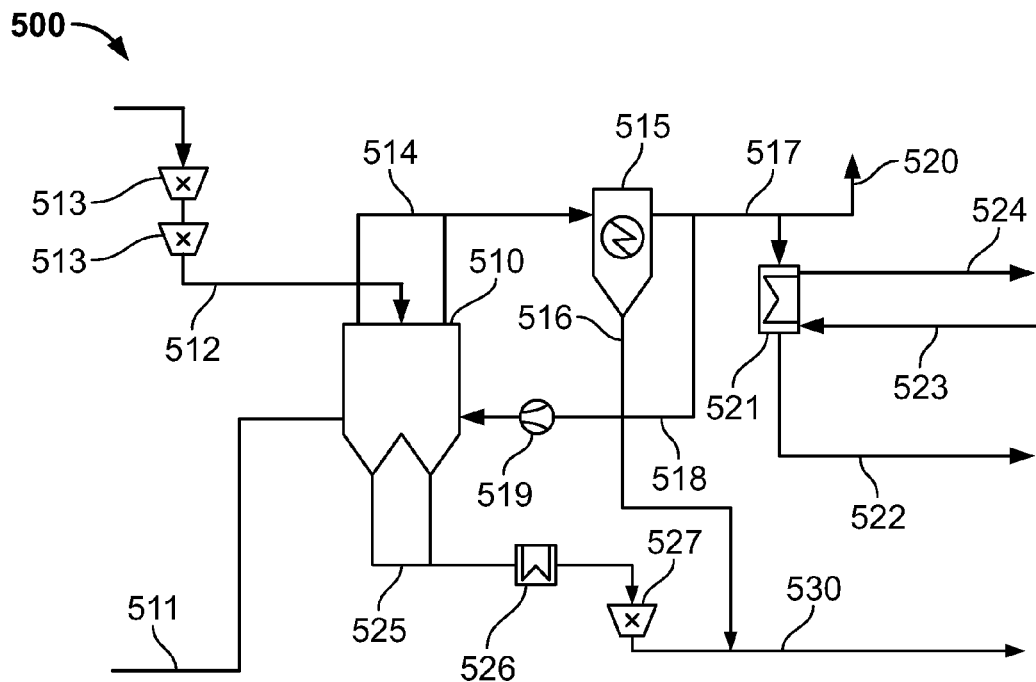
FIG. 3 is a schematic diagram of an embodiment of a lignite drying process according to the invention.

In yet another embodiment of the invention, the waste heat reuse process 130 (FIG. 1) is a lignite drying process. An embodiment of a lignite drying process 500 is shown in FIG. 3. Referring to FIG. 3, heated air from the $CO_2$ compression process 120 (FIG. 1) is provided to a fluidized bed reactor 510 via a heated air supply line 511. The heated air supply line 511 receives heated air line 331 of the $CO_2$ compression process 120 (FIG. 1). The heated air removes moisture from lignite provided to the fluidized bed via lignite feed line 512. The lignite is raw milled by lignite raw mills 513 to reduce the particle size of the lignite prior to being provided to the fluidized bed reactor 510. In another embodiment, one or more raw mills 513 may be used.

In the fluidized bed reactor 510, the heated air contacts the lignite and removes moisture from the lignite. The heated air from the $CO_2$ compression process may be combined with heated air from a regenerative air heater or other source before being introduced to the fluidized bed reactor 510. In one embodiment, the heated air may be provided to the fluidized bed reactor at a temperature up to about 80° C. In another embodiment, heated air from separate sources may be provided individually to the fluidized bed reactor 510. In such a manner, the current invention utilizes waste heat to dry or to supplement drying of lignite, in contrast to conventional lignite drying operations using steam to dry lignite. The present invention thus reduces the steam used in plant operations.

The heated air containing moisture is discharged from the fluidized bed reactor 510 via a discharge line 514 and provided to a separator 515. The separator 515 may be an electrostatic precipitator. At the separator 515, any solids, including any lignite, are separated from the heated air containing moisture. The solids are discharged from the separator through discharge line 516. The heated air containing moisture is discharged from the separator 515 through discharge line 517. The heated air containing moisture may then either be returned to the fluidized bed reactor via line 518 and blower 519, released to the atmosphere via line 520, or provided to a vapor condenser 521 to further separate moisture and/or vapor condensate from the air, which is discharged via line 522. The vapor condenser 521 is provided with a cooling fluid through feed line 523 and return line 524. The cooling fluid removes heat from the heated air containing moisture to further condense the moisture.

At the fluidized bed reactor 510, the lignite having moisture removed is discharged through discharge line 525. The lignite is then cooled by a cooler 526 and provided to a mill 527 to further reduce the particle size of the lignite. The dry lignite is then combined with any lignite separated from the precipitator and discharged via line 530 to a boiler (not shown). In another embodiment, heated air from the $CO_2$ compression process 120 (FIG. 1) may be used to remove moisture from lignite before the lignite is provided to the at least one raw lignite mill 513. In this embodiment, the heated air may contact the lignite in a second fluidized bed reactor (not shown).

Figure 4:
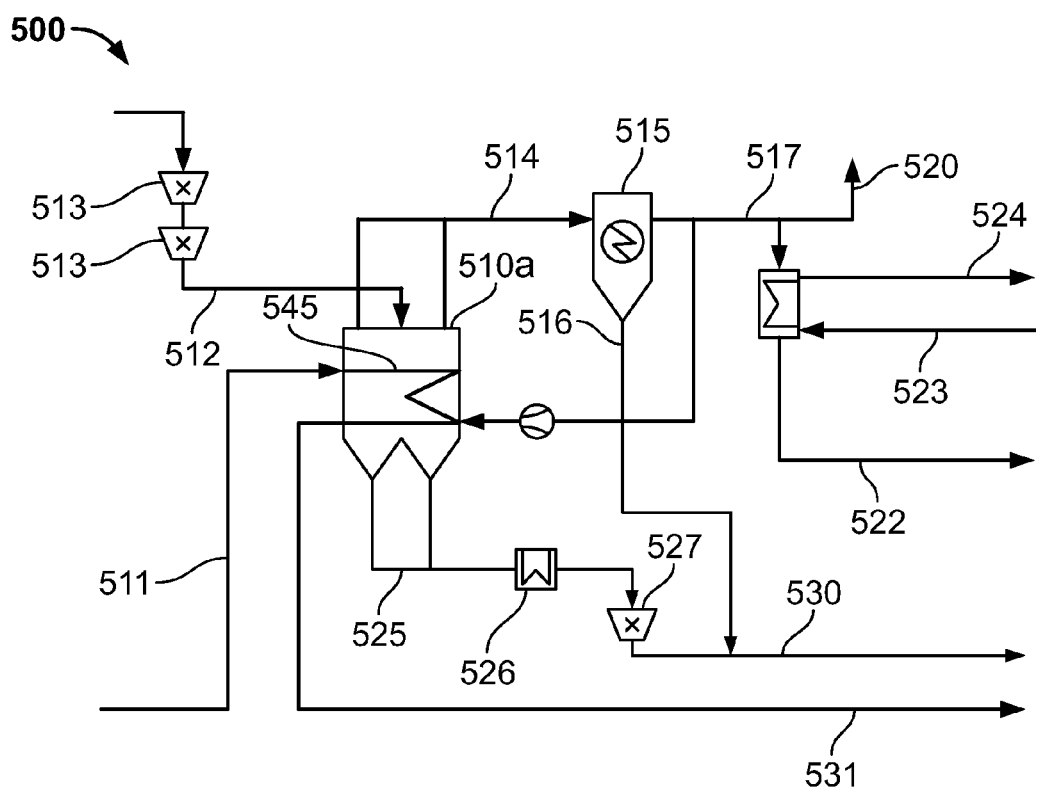
FIG. 4 is a schematic diagram of another embodiment of a lignite drying process according to the invention.

Another embodiment of a lignite drying process 500 according to the disclosure is shown in FIG. 4. As can be seen in FIG. 4, a drier 510a is used in place of the fluidized bed reactor 510 of the embodiment described in FIG. 3. Referring to FIG. 4, heated air from the $CO_2$ compression process 120 (FIG. 1) is provided to a drier 510a via a heated air supply line 511. The heated air circulates through pipes 545 in the drier 510a and does not contact the lignite. The heated air heats the lignite and causes moisture to be removed from the lignite. The moisture is removed from the drier 510a via discharge line 514. The heated air, having lost heat to the lignite, is then discharged from the drier 510a through discharge line 531. The other components of FIG. 4 are as described in the embodiment shown in FIG. 3.

While only certain features and embodiments of the invention have been illustrated and described, many modifications and changes may occur to those skilled in the art (for example, variations in sizes, dimensions, structures, shapes and proportions of the various elements, values of parameters, such as, but not limited to temperatures, pressures, mounting arrangements, use of materials, colors, orientations, etc., without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (that is, those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A system for recovering heat, comprising:
   a capture system for separating $CO_2$ from a gas stream;
   a compression system for compressing $CO_2$ separated from the gas stream,
   the compression system comprising at least one heated air stream heated by the compression system; and
   a fuel treatment system that receives the at least one heated air stream.

2. The system of claim 1, wherein the compression system comprises at least one flash unit forming the at least one heated air stream.

3. The system of claim 1, wherein the compression system comprises at least one heat exchanger forming the at least one heated air stream.

4. The system of claim 1, wherein the fuel treatment system is a lignite drying system.

5. The system of claim 1, wherein the capture system is an ammonia based system.

6. The system of claim 1, wherein the fuel treatment system is configured to heat a fossil fuel by contacting the fossil fuel with the heating air stream.

7. The system of claim 1, wherein the fuel treatment system is configured to heat a fossil fuel without contacting the fossil fuel with the heated air stream.

8. The system of claim 4, wherein the lignite drying system is configured to heat lignite with heated air form the at least one flash unit without contacting the lignite with the heated air.

9. The system of claim 1, wherein the fuel treatment system is a coal drying system.

10. The system of claim 1, wherein the capture system is an amine based system.

11. The system of claim 2, wherein the at least one flash unit comprises a second flash unit forming a second heated air stream by flashed $CO_2$.

12. The system of claim 1, wherein the heat exchanger comprises an intercooler disposed after the compression system.

* * * * *